United States Patent [19]

Spacht

[11] 3,714,264

[45] Jan. 30, 1973

[54] ALYLATION PRODUCT OF 4(METHYLTHIO) PHENOL

[75] Inventor: Ronald B. Spacht, Hudson, Ohio

[73] Assignee: The Goodyear Tire & Rubber Company, Akron, Ohio

[22] Filed: Aug. 17, 1970

[21] Appl. No.: 64,641

Related U.S. Application Data

[62] Division of Ser. No. 664,602, Aug. 31, 1967, Pat. No. 3,553,163.

[52] U.S. Cl. ............................................. 260/609 F
[51] Int. Cl. .............................................. C07c 149/36
[58] Field of Search .................................. 260/60 QF

[56] References Cited

UNITED STATES PATENTS

| 3,260,758 | 7/1966 | O3'Shea | 260/609 F |
| 3,260,757 | 7/1966 | O'Shea | 260/609 F |

FOREIGN PATENTS OR APPLICATIONS

| 812,530 | 4/1959 | Great Britain | 260/609 F |
| 1,117,110 | 5/1962 | Germany | 260/609 F |
| 1,116,656 | 5/1962 | Germany | 26/609 F |

*Primary Examiner*—Elbert L. Roberts
*Assistant Examiner*—D. R. Phillips
*Attorney*—F. W. Brunner and Vernon G. Parker

[57] ABSTRACT

Alkylthio substituted mononuclear phenolic age resistors and age resistant polymers containing said age resisters.

2 Claims, No Drawings

ALYLATION PRODUCT OF 4(METHYLTHIO) PHENOL

This is a division of application Ser. No. 664,602, filed Aug. 31, 1967, which issued Jan. 5, 1971, as U.S. Pat. No. 3,553,163.

This invention relates to age resistors for oxidizable organic materials, their preparation and use in the stabilization of polymers which normally tend to deteriorate when exposed to normal atmospheric conditions and in particular when exposed to sunlight and/or elevated temperatures in the presence of air or oxygen.

Polymers have proven to be some of the most difficult organic materials to successfully stabilize against the deleterious effects of oxygen and ozone, particularly rubbery polymers, both natural and synthetic. Both vulcanized and unvulcanized polymers are susceptible to the deleterious effects that are found in normal atmospheric conditions, and although many materials have been suggested and used as polymer stabilizers no completely satisfactory material has been found that will fully protect these polymers under the widely different conditions to which they are subjected. The search for new and better polymer stabilizers such as phenolic stabilizers that are active and relatively nondiscoloring is therefore a problem which continues to command the attention of many skilled investigators.

It is therefore an object of this invention to provide a new class of phenolic antioxidants. Another object of this invention is to provide a new class of stabilizers for organic compounds that are relatively nondiscoloring.

In accordance with the present invention it has been found that the foregoing and additional objectives can be accomplished by employing as stabilizers for polymeric materials which are subject to the deleterious effects of oxygen, ozone and sunlight, phenolic compounds conforming to the following structural formula:

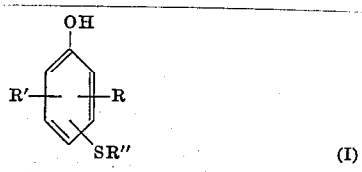

(I)

wherein R is selected from the group consisting of hydrogen, alkyl radicals containing one to 12 carbon atoms, cycloalkyl radicals containing five to nine carbon atoms, and aralkyl radicals containing seven to nine carbon atoms, R' is selected from the group consisting of alkyl radicals containing one to 12 carbon atoms, cycloalkyl radicals containing five to nine carbon atoms and aralkyl radicals containing seven to nine carbon atoms and R'' is a hydrocarbon radical containing one to 20 carbon atoms. Preferably R'' is an alkyl radical containing one to 12 carbon atoms.

Examples of specific compounds that conform to the above recited structural formula I are listed below:
2-tert. butyl-4-methylthio phenol
2,6-ditert. butyl-4-methylthio phenol
2-benzyl-4-methylthio phenol
2-benzyl-4-ethylthio-6-tert. butyl phenol
2-α-phenylethyl-4-propylthio phenol
6-tert. butyl-3-octylthio phenol
6-cyclohexyl-3-methylthio phenol
2,4-ditert. butyl-3-dodecylthio phenol
6-tert. octyl-3-methylthio phenol
2-tert. dodecyl-4-methylthio phenol The aralkyl derivatives are particularly effective under conditions wherein the stabilized polymer or its vulcanizates are subjected to prolonged periods at high temperatures in the presence of air and/or oxygen.

Preferred compounds of the present invention are in particular those which conform to the above structural formula I wherein R is selected from the group consisting of hydrogen and alkyl radicals containing one to 12 carbon atoms, R' is a tertiary alkyl radical containing 4 to 12 carbon atoms and R'' is an alkyl radical selected from the group consisting of methyl, ethyl, propyl and isopropyl.

Specific examples of these preferred compounds are listed below:
3-methylthio-4-tert. butyl phenol
2-methylthio-5-tert. amyl phenol
3-tert. butyl-4-ethylthio phenol
3-propylthio-4-tert. hexyl phenol
6-tert. butyl-3-methylthio phenol
6-tert. amyl-2-ethylthio phenol
2-methyl-4-methylthio-6-tert. butyl phenol
2,6-ditert. butyl-4-methylthio phenol
2-benzyl-4-methylthio-6-tert. butyl phenol
4,6-ditert. butyl-3-methylthio phenol Even more preferred compounds are those wherein R' is attached to the phenolic nucleus in a position ortho to the hydroxyl group. Specific examples of these more preferred compounds are listed below:
2-tert. butyl-4-methylthio phenol
6-tert. dodecyl-3-propylthio phenol
4-methyl-2-propylthio-6-tert. butyl phenol The most preferred compounds are:
6-tert. butyl-3-methylthio phenol
2-tert. butyl-4-methylthio phenol
6-tert. butyl-2-methylthio phenol One of the methods of preparing some of the compounds of this invention comprises reacting a mixture comprising (A) at least one phenol conforming to the following structural formula:

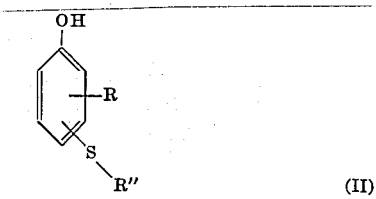

(II)

wherein R is selected from the group consisting of hydrogen, alkyl radicals containing one to 12 carbon atoms, cycloalkyl radicals containing five to nine carbon atoms and aralkyl radicals containing seven to nine carbon atoms and R'' is a hydrocarbon radical containing one to 20 carbon atoms and (B) at least one compound selected from the group consisting of olefins containing two to 12 carbon atoms, cycloolefins containing five to nine carbon atoms and arylalkenes containing from seven to nine carbon atoms. Preferably R'' is an alkyl radical containing one to 12 carbon atoms. Component (B) is preferably a tertiary olefin containing four to 12 carbon atoms.

An active halogen compound in some instances can also be used to alkylate the phenol. For example, a compound such as benzyl chloride can be reacted with the phenol normally in the presence of a Friedel-Crafts type catalyst to provide an aralkyl substituent.

Examples of specific compounds that conform to the above recited structural formula (II) are listed below:

2-α-phenylethyl-4-methylthio phenol
4-benzyl-2-propylthio phenol
4-α-phenylethyl-2-propylthio phenol
3-benzyl-4-methylthio phenol
6-dimethylbenzyl-3-hexylthio phenol
2-α-tolylethyl-4-butylthio phenol
4-α-phenylethyl-3-ethylthio phenol
2-benzyl-4-dodecylthio phenol
2-methylthio phenol
3-ethylthio phenol
4-propylthio phenol
2-ethyl-4-methylthio phenol
4-propyl-2-methylthio phenol
2-cyclohexyl-4-ethylthio phenol Preferred phenolic reactants to be used in the previously described method are those conforming to structural formula (II) above wherein R is selected from the group consisting of hydrogen and alkyl radicals containing one to 12 carbon atoms and R'' is an alkyl radical selected from the group consisting of methyl, ethyl, propyl and isopropyl. Examples of these preferred phenolic reactants are listed below:

2-methylthio phenol
3-methylthio phenol
4-methylthio phenol
3-ethylthio-4-methyl phenol
3-propylthio-4-ethyl phenol
2-ethylthio-5-propyl phenol
2-methyl-4-ethylthio phenol
2-propyl-4-butylthio phenol Representative examples of the olefin type materials that can be used in the above method are:

1-propene
1-butene
1-pentene
2-pentene
2-methyl-1-propene
2-methyl-1-butene
2-methyl-2-butene
2-methyl-1-pentene
2-methyl-2-pentene
3-methyl-2-pentene
2-methyl-1-hexene
2-methyl-2-hexene
3-methyl-2-hexene
3-methyl-3-hexene
2,4,4-trimethyl-1-pentene cyclohexene
styrene
cyclopentene
methyl cyclohexene
α-methyl styrene
vinyl toluene
methyl cyclopentene The most preferred olefins are tertiary olefins posessing 4 to 12 carbon atoms such as some of those listed above.

In carrying out the previously described method a Friedel-Crafts type catalyst, such as toluene sulfonic acid, anhydrous aluminum chloride, anhydrous ferric chloride and sulfuric acid can be used.

Solvents that may be used are selected from aromatic solvents such as benzene, toluene, xylene and from aliphatic solvents such as hexane, heptane, gasoline, cyclohexane, etc.

Temperatures used for all processes are from 20° to 150° C. In general, reactions involving halides will be at higher temperatures than those involving alkylation with olefins. Preferred temperatures for reactions involving elimination of hydrogen halide are from 100° to 150° C. Preferred temperatures for alkylation reactions are from 60° to 100° C.

Molar ratios of reactants will depend primarily on the number of open positions (ortho and para) on the alkylthio phenol. At least one mol of alkylating agent (olefin, benzyl halide, etc.) should be used per mol of alkylthio phenol. A slight excess of alkylating agent is preferred. In case the alkylthio phenol has two reactive positions up to two mols of alkylating agent may be used.

The following specific examples that show the preparation of compounds conforming to the present invention are intended to be illustrative of the class of compounds disclosed and a method of their preparation but are not to be interpreted as limitations of the invention.

EXAMPLE 1

Seventy-seven grams of 4(methylthio)-meta-cresol, 100 milliliters of benzene and 3.0 grams of sulfuric acid were warmed to 50° C. Fifty-two grams of styrene were then added over a 0.5 hour period. The mixture was then allowed to react overnight predominantly at room temperature. The catalyst was neutralized with aqueous sodium carbonate and the aqueous layer decanted. The mixture was heated under vacuum to remove volatiles. The yield was quantitative based on the materials charged.

EXAMPLE 2

Seventy-seven grams of 4(methylthio)-meta-cresol, 64 grams of benzyl chloride and 0.5 gram of zinc chloride were mixed together and heated. All of the HCl resulting from the reaction was liberated after 5 hours at a maximum temperature of 115° C. The mixture was heated to 170° C. at 25 millimeters of mercury to remove volatiles. The yield was quantitative based on a 1:1 molar ratio.

EXAMPLE 3

Seventy grams of 4(methylthio) phenol were dissolved in 100 milliliters of toluene, to which was then added 4.0 grams of concentrated sulfuric acid. Isobutylene was added at a temperature of about 100° C. When the butylation was completed the catalyst was destroyed with aqueous sodium carbonate. After decantation of the water layer the residue was heated to 150° C. at 30 millimeters of mercury to remove the volatiles. The weight of product was 100 grams.

EXAMPLE 4

Seventy-seven grams of 4(methylthio)-meta-cresol, 100 milliliters of toluene and 4.0 grams of concentrated sulfuric acid were heated to 100° C. Isobutene was then added over a period of 3.5 hours. When butylation was completed the catalyst was destroyed with aqueous sodium carbonate. After decantation of the water layer the residue was heated to 150° C. at 30 millimeters of mercury to remove the volatiles. The weight of product was 97.0 grams.

The compounds of this invention are useful in protecting polymers in any form, e.g., polymer in latex form, unvulcanized polymer and vulcanized polymer. They are highly efficient and are capable of being employed in relatively small amounts to effectively stabilize the polymers into which they are incorporated. Normally 0.001 to 5.0 percent of the antioxidant by weight based on the weight of the polymer can be used, although the precise amount of these highly effective stabilizers which is to be employed will depend somewhat on the nature of the polymer and the severity of the deteriorating conditions to which the polymer is to be exposed. In unsaturated polymers such as those made from conjugated dienes the amount of antioxidant necessary is greater than that required by a saturated polymer such as polyethylene. It has been found that an effective antioxidant of the disclosed stabilizers in rubbery polymers will generally range from 0.05 to 5.0 percent by weight based on the weight of the polymer although it is commonly preferred to use from 0.5 to 2.0 percent by weight based on the weight of the polymer.

The polymers that may be conveniently protected by the phenolic compounds in accordance with this invention are vulcanized and unvulcanized oxidizable rubber and those synthetic oxidizable polymers which are normally susceptible to deterioration by sunlight and atmospheric oxygen such as prepared from conjugated dienes as well as the synthetic polymers and copolymers prepared from monoolefins. Representative examples of the synthetic polymers used in the practice of this invention are polychloroprene; homopolymers of a conjugated 1,3-diene such as isoprene and butadiene and in particular, polyisoprenes and polybutadienes having essentially all of their segmeric units combined in a cis-1,4 structure; copolymers of a conjugated 1,3-diene such as isoprene and butadiene with up to 50 percent by weight of the polymer of at least one copolymerizable monomer such as styrene and acrylonitrile; butyl rubber, which is a polymerization product of a major proportion of a monoolefin and minor proportion of a multiolefin such as butadiene or isoprene; and polymers and copolymers of monoolefins containing little or no unsaturation, such as polyethylene, polypropylene, ethylene propylene copolymers and terpolymers of ethylene, propylene and a nonconjugated diene.

The practice of this invention is found particularly beneficial when applied to the stabilization of homopolymers of a conjugated 1,3-diene such as isoprene and butadiene and copolymers of said diene with up to 50 percent by weight of at least one copolymerizable monomer such as styrene and acrylonitrile. The practice of this invention is found most beneficial when applied to the stabilization of copolymers of butadiene and styrene. The method of addition of the stabilizers to the polymers is not critical. The stabilizers of the present invention may be incorporated into the polymers by any conventional means such as by adding to the polymer in latex form, to a solution of the polymer, to the polymer on an open mill, by internal mixing, etc.

In order to evaluate the effectiveness of the compounds of this invention as stabilizers for polymers representative compounds of this invention were incorporated into an oxidizable polymer.

EXAMPLE 5

The products of Examples 3 and 4 (Experiments D and E) were used to stabilize an extracted pale crepe natural rubber. One part of each product was added to a portion of the natural rubber on an open mill as part of the following formulation:

| Ingredient | Parts |
|---|---|
| Extracted pale crepe | 100.00 |
| Zinc oxide | 5.00 |
| Sulfur | 3.00 |
| Hexamethylenetetramine | 1.00 |
| Stearic acid | 1.50 |
| Antioxidant | 1.00 |

The compounded rubber was then vulcanized, one portion for 70 minutes at 285° F. and another portion of 90 minutes at 285° F. Each portion was then aged in an oxygen bomb according to ASTMD-572. The percent tensile retention and weight increase after aging was taken as measures of antioxidant efficiency. Other portions of the extracted pale crepe were stabilized and tested in the same manner with 1.0 part of 4(methylthio) phenol (Experiment B), a compound not within the scope of the present invention, and 4(methylthio)-m-cresol (Experiment C), a compound within the scope of the present invention. A control containing no antioxidant was also compounded, vulcanized, aged and tested. The data are listed in Table I.

Table I

| Exp. | Antioxidant | % Tensile Retention | | % Weight Increase | |
|---|---|---|---|---|---|
| | | 70/285 | 90/285 | 70/285 | 90/285 |
| A | None | 0 | 0 | 17+ | 17+ |
| B | 4(methylthio) phenol | 50.6 | 21.4 | 1.09 | 7.70 |
| C | 4(methylthio)-m-cresol | 62.1 | 40.4 | 0.510 | 1.68 |
| D | butylated 4 (methylthio) phenol (Ex. 3) | 77.0 | 51.0 | 0.255 | 0.443 |
| E | butylated 4 (methylthio) m-cresol (Ex. 4) | 53.8 | 34.4 | 0.813 | 1.45 |

The above data reveal that materials within the practice of the present invention (Experiments C, D and E) afforded greater protection to the pale crepe than did the unsubstituted alkylthio phenol (Experiment B) and the unstabilized polymer (Experiment A).

EXAMPLE 6

Polypropylene (Profax 6501) was stabilized with 0.10 part of a stabilizer within the scope of the present invention, the stabilizer of Example 3 (Experiment H). Another portion of the polypropylene was stabilized with 0.10 part of 2,6-ditertiary-butyl-p-cresol, a commercial antioxidant (Experiment G). The yield tensiles and melt indices of these stabilized samples were compared with those of an unstabilized polypropylene control (Experiment F).

The polypropylene samples can be prepared in the following manner. The stabilizer can be dissolved in acetone or hexane in a concentration of 1 to 5 percent. The stabilizer solution can then be added to the polypropylene (Pro-Fax 6501) by dispersing the stabilizer solutions in the powdered polypropylene using a Henschel blender and agitating at 2,800 rpm. After 15 minutes the typical batch temperature will normally approach 180° F. and a reasonable dispersion of the stabilizers will be obtained. After 10 minutes only traces of the solvent will normally remain.

The stabilized polypropylenes were injection molded to produce tensile bars, said tensile bars conforming to ASTM-D-638-64 T. The tensile bars were aged at 140° C. in a forced air oven. The stress-strain properties of the original and aged samples were measured by an Instron. A 4½ inch jaw was used, the jaw separation rate being 1 inch per minute.

Melt index determinations were made on the aged and unaged tensile bars which had been cut up into small pieces. The melt index test was run according to ASTM D-1238-62 T, Condition L. As the polymer degrades the molecular weight is reduced by chain scission. The melt index indicates the molecular weight reduction and is expressed as grams of polymer extruded per unit time. As the molecular weight decreases due to degradation the melt index increases.

The test results appear in Table II.

Table II

| ex. | anti-oxidant | Yield Tensile (psi) | | | Melt Index [1] | | |
|---|---|---|---|---|---|---|---|
| | | Un-aged | Aged 1 day | 3 days | Unaged | Aged 1 day | 3 days |
| F | None | 5470 | 3300 | Failed | 3.68 | Failed | Failed |
| G | 2,6-ditertiary-butyl-p-cresol | 5520 | 5010 | 1190 | 2.71 | 8.14 | Failed |
| H | ex. 3 | 5530 | 4830 | 3630 | 2.95 | 5.24 | Failed |

\* — At 140°C.
[1] — Expressed as grams of polymer extruded per 10 minutes.

The above results reveal the stabilization afforded polypropylene by the compounds of the present invention. Whereas the yield tensile of the unstabilized polypropylene (Experiment F) dropped appreciably on aging, the yield tensile of the polypropylene stabilized with a compound of the present invention (Experiment H) dropped more slowly and in fact was superior to the commercial antioxidant (Experiment G) in this respect.

The melt index on aging of the polypropylene stabilized with a compound of the present invention (Experiment H) was superior on aging to both the unstabilized polypropylene (Experiment F) and the polypropylene stabilized with the commercial antioxidant (Experiment G).

While certain representative embodiments and details have been shown for the purpose of illustrating the invention it will be apparent to those skilled in this art that various changes and modifications may be made without departing from the spirit or scope of the invention.

What I claim is:

1. An alkylation reaction product prepared by alkylating 4(methylthio)phenol with an olefin selected from the group consisting of
   2-methyl-1-propene
   2-methyl-1-butene
   2-methyl-2-butene
   2-methyl-1-pentene
   2-methyl-2-pentene
   3-methyl-2-pentene
   2-methyl-1-hexene
   2-methyl-2-hexene'
   3-methyl-2-hexene
   3-methyl-3-hexene and
   2,4,4-trimethyl-1-pentene,
wherein the alkylation occurs at a temperature of from 20° C. to 150° C. in the presence of a Friedel Crafts type catalyst, at least one mol of olefin being charged per mol of 4(methylthio) phenol.

2. The product of claim 1 wherein the olefin is 2-methyl-1-propene.

* * * * *